United States Patent Office 3,113,582
Patented Dec. 10, 1963

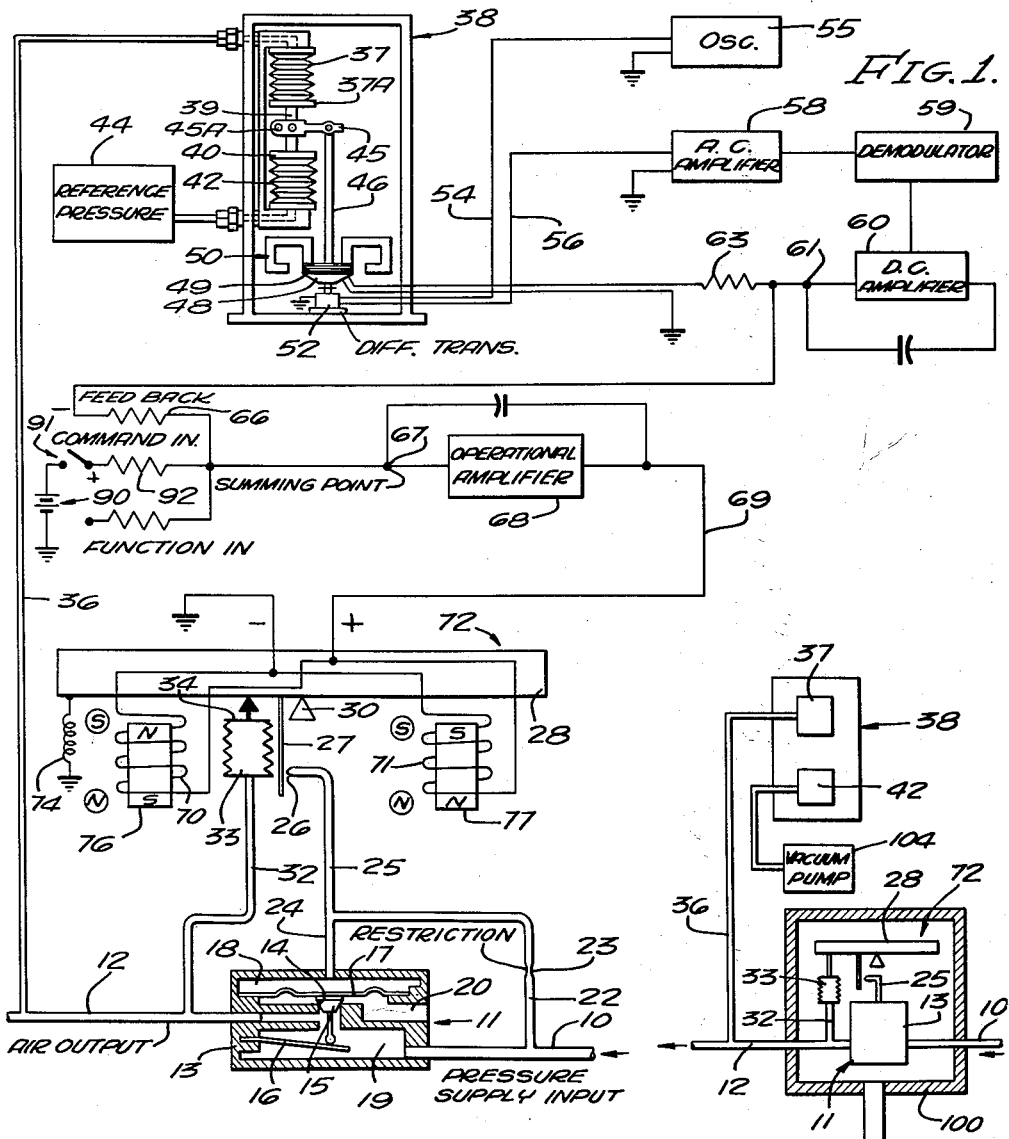

3,113,582
PRESSURE CONTROL SYSTEM
Harold R. Hudson, Santa Monica, Calif., assignor, by mesne assignments, to Fluidgenics, National City, Calif., a corporation of California
Filed Jan. 11, 1961, Ser. No. 82,093
19 Claims. (Cl. 137—115)

The present invention relates to pressure control systems.

The pressure control system as disclosed herein involves generally an input pressure line, an output pressure line and a bleed valve between said lines for bleeding pressure so as to maintain the pressure in said outlet line constant with a great accuracy. This is accomplished by sensing the pressure in the outlet line and comparing the same with a standard pressure and developing an output voltage as a result of such comparison. Such voltage developed as a result of a servo action is applied to a voltage-to-pressure transducer which controls the bleed valve to provide continuous correction for any deviation in pressure in said outlet line.

It is therefore an object of the present invention to provide a novel pressure control system functioning generally to accomplish features indicated above.

Another object of the present invention is to provide a system of this character which controls or regulates either above or subatmospheric pressures and in an absolute pressure sense.

Another object of the present invention is to provide a system of this character in which other voltages may be combined to adjust or vary that pressure which is to be maintained constant.

Another object of the present invention is to provide a system of this character in which the voltage applied to the voltage-to-pressure transducer is controlled with a high degree of accuracy and in which the pressure-to-voltage transducer operates faster than the voltage-to-pressure transducer to assure accuracy and reliability.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates a system embodying the present invention.

FIGURE 2 illustrates the manner in which the system shown in FIGURE 1 is subjected to subatmospheric pressures for regulating or controlling subatmospheric pressures and in an absolute pressure sense.

Referring to the drawings, in one form of the invention the pressure of the medium, either gas or liquid, entering the inlet conduit 10 passes through the relay valve assembly 11 in the nature of a continuous bleed or spill valve which serves to control or regulate the pressure in the outlet conduit 12.

The valve assembly 11 includes a casing 13 in which is formed a valve port or orifice 14 between the inlet 10 and outlet 12 and a movable valve element 15 in port 14. The valve element 15 is spring-biased by leaf spring 16 into engagement with a flexible diaphragm 17 defining a movable wall of chamber 18 and controls the flow of fluid from the inlet chamber 19 to the conduit 20 which leads to the environment in achieving a bleeding or spilling action in the particular form of the invention now being described.

The inlet conduit 10 is also in communication with conduit 22 having a surge-preventing or damping restricted opening 23, this conduit 22 being in communication with conduit 24 which leads to diaphragm chamber 18 and being also in communication with conduit 25 which terminates in a nozzle 26 spaced adjacent a flapper arm 27 on an armature bar 28 pivoted on a fixed pivot or fulcrum 30 for purposes described later.

The outlet conduit 12 in which controlled or regulated pressure exists is in communication with conduit 32 extending to feedback bellows 33 having a movable wall exerting a feedback force on the pivoted armature bar 28; and also conduit 12 is in communication with conduit 36 leading to bellows 37 in a pressure-to-voltage transducer 38 which may be a commercially-available type manufactured by Consolidated Electrodynamics Corporation.

The bellows 37 has a movable wall 37A connected to link 39 extending to and attached to movable wall 40 of bellows 42 to which pressure is supplied from a reference pressure source 44.

Link 39 is interconnected by a lever 45 pivoted at 45A and stem 46 to a movable spool 48 on which is mounted a coil 49 cooperating magnetically with a stationary magnet assembly 50 to obtain an action much like that in the voice coil of a conventional audio frequency speaker. This stem 46 extends through spool 48 and has attached thereto the movable element of a conventional differential-type transformer 52 which may be of the E type supplied with an alternating current over lead 54 from an oscillator 55 operating at a frequency higher than 10 cycles per second. An unbalanced voltage developed in the differential transformer is supplied over lead 56 to the input circuit of the A.C. amplifier having its output coupled to demodulator or rectifier 59 which supplies a unidirectional or D.C. output to the input circuit of D.C. operational amplifier 60 of the integrator type and having its output terminal coupled through resistance 63 to the ungrounded terminal of "voice" coil 49 to complete a servo loop functioning to reduce or tending to reduce the A.C. voltage on lead 56 to zero in the balanced condition of the system as described more fully later.

The D.C. voltage developed on output terminal 61 is applied also through so-called feedback resistance 66 to a summing point or terminal 67 forming the input terminal to operational amplifier 68 also of the integrator type and having its output supplied over lead 69 to the parallel connected coils 70 and 71 of the voltage-to-pneumatic transducer 72 of the type made, for example, by the Foxboro Company.

These coils 70 and 71 are wound on permanent polarizing magnets 76 and 77 respectively having the magnetic polarity indicated by the N and S signs thereon and cooperating magnetically with the pivoted armature bar 28. These coils 70 and 71 have the magnetic polarities indicated by the N and S letters in circles and it will be observed that energization of coil 70 results in less net magnetic flux from the coil-magnet assembly 70, 76, whereas energization of coil 71 results in more net magnetic flux from coil-magnet assembly 71, 77 so that this tends to pivot the attracted armature bar 28 clockwise about the pivot 30 against the action of coil tension spring 74 but such tendency is overcome as a result of pressure change at the nozzle 26 which in turn decreases the pressure in conduit 12 and bellows 37 and 33 to restore the armature bar 28 to a balanced condition by servo action as described in more detail below.

In operation of the system as described above, the pressure in outlet line 12 is controlled or regulated by movement of spill or bleed valve element 15 which allows more or less spillage or bleeding of the fluid through conduit 20 to effect a substantially constant pressure in outlet line 12 regardless of, for example, pressure variations in inlet line 10. Movement of such valve 15 is effected by regulation or control of the pressure in diaphragm chamber 18, the pressure in chamber 18 being generally higher, the closer the flapper arm 27 is positioned adjacent nozzle 26 which means that the closer the flapper arm 27 is moved to nozzle 26, the further is spill valve 14, 15 closed against the action of leaf spring 16 to tend to increase the pressure in outlet line 12 but this assumed increase in pressure in line 12 results in increased pressure in feedback bellows 33 which tends to move the flapper arm 27 further away from nozzle 26 to thereby tend to restore the pressure in line 12 to a constant value. This action is supplemented by feedback action acting contemporaneously as a result of operation of the pressure balance system 38 functioning to balance the pressure in output line 12 against the pressure from a constant pressure reference source 44.

Assuming as before that the pressure in line 12 tends to rise, there is increased pressure in bellows 37 that moves the stem 46 downwardly to unbalance the differential transformer 52, i.e. to produce an error voltage on lead 56. This error voltage appears in a servo loop which includes amplifier 58, demodulator 59, amplifier 60, resistance 63 and coil 49 mounted on the same stem 46 which produced the assumed unbalance in the differential transformer 52. Due to servo action, this assumed error voltage on lead 56 is automatically reduced to zero by applying more current through coil 49, changing the magnetic attraction between coil 49 and the stationary magnetic assembly 50 such that the stem is restored to a balanced position corresponding to the balanced condition of differential transformer 52. This rebalancing results also in an increased current through the parallel connected coils 70 and 71 such that the net magnetic flux produced in coil-magnet assembly 71, 77 is increased and the net magnetic flux in coil-magnet assembly 70, 76 is decreased to thereby tend to pivot armature bar 28 clockwise and move the flapper arm 27 away from nozzle 25 to in turn decrease the pressure in chamber 18 and allow more spillage through conduit 29, i.e. decrease the pressure in line 12 to its constant value.

For these purposes the pressure-to-voltage transducer 38 acts faster than the voltage-to-pressure transducer 72, the former having a time constant corresponding to 10 cycles per second and the latter having a time constant corresponding to 4 cycles per second. It will be observed from the above that the feedback voltage of negative polarity is applied through feedback resistance 66 to the input circuit of the integrator amplifier circuit 68. The output of amplifier 68 is used as the electrical input to the voltage-to-pressure transducer 72 which converts the electrical signal to a corresponding pressure change in conduit 12 as a result of corresponding pressure change in chamber 18. This pressure change is fed back to the pressure-to-voltage transducer 38 which converts the actual pressure back to an equivalent electrical signal which is fed back to the input of integrator amplifier 68 and causes the voltage-to-pressure transducer to remain at a specified setting, thus producing a stabilized pressure output through this above-described servo action.

The system may be adjusted to maintain different values of constant pressure by applying a corresponding unidirectional or D.C. signal to the input terminal 67 of amplifier 68, i.e. the summing point 67. This is accomplished, as exemplified, by applying a positive command voltage from the series connected source 90, manually operable switch 91 and resistance 92 to the summing point 67 and the net signal at such point 67 is converted into a corresponding pressure by transducer 72 wherein the torque or moments developed on pivoted armature bar 28 are balanced by resulting feedback to the pressure-to-voltage transducer 38 which detects correct pressure and maintains it by providing feedback voltage to the transducer 72.

The system is capable also of regulating pressures below atmospheric or for use as a regulator or control of absolute pressures in which case, as illustrated in FIGURE 2, the voltage-to-pressure transducer 72, including also the relay valve 13, is encased in a vacuum housing 100 which is evacuated by vacuum pump 101 and the pressure input to line or conduit 10 is referenced to sea level pressure. Also, the opposite side of the pressure-to-voltage transducer 38, i.e. bellows 42, is referenced to a standard vacuum pressure by vacuum pump 104 which need only develop a vacuum pressure less than that which is being controlled in line 12.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A pressure control system comprising, a supply line, an outlet line, a pressure bleed valve interposed between said lines, a pressure-to-voltage transducer responsive to pressure in said outlet line and developing a signal in response to said pressure in said outlet line, a voltage-to-pressure transducer, said voltage to pressure transducer including means responsive to said pressure in said outlet line whereby said voltage to pressure transducer is rendered jointly responsive to said signal and said pressure in said outlet line for developing a second pressure in response to said signal and to said pressure in said outlet line, and means controlling said bleed valve in accordance with said second pressure.

2. A system as set forth in claim 1 in which said pressure-to-voltage transducer includes pressure-balancing means and a servo system responsive to unbalance in said balancing means for balancing the same.

3. A system as set forth in claim 1 including means for applying and combining an additional control signal to said signal developed by the first-mentioned transducer.

4. A pressure control system including an inlet line; an outlet line; a bleed valve between said lines and incorporating means for bleeding pressure from said inlet line; a pressure-to-voltage transducer including: a pair of oppositely-acting bellows, conduit means communicating said outlet line with one of said bellows, a reference pressure source communicating with the other one of said bellows, means interconnecting said bellows including a movable element positioned in accordance with differences in pressure applied to said bellows, a stationary magnetic structure, a coil on said element and cooperating magnetically with said structure to develop forces therebetween, a differential transformer mechanically coupled to said element for developing a signal in response to positioning of said element, a servo system responsive to said signal and developing and applying a voltage to said coil for repositioning said element to a position wherein said signal is nullified; a voltage-to-pressure transducer including: an armature bar, means pivoting said armature bar at a point intermediate its ends, a polarized magnetic structure cooperating magnetically with each end of said bar, means applying said voltage developed by the first-mentioned transducer to each polarized magnetic structure, means applying the pressure in said outlet line to said armature bar for pivoting the same in response to said pressure in said outlet line, and means operated by said armature bar for controlling said bleeding means.

5. A system as set forth in claim 4 indicating means for combining a command voltage with said voltage developed by the first-mentioned transducer.

6. A system as set forth in claim 4 including means enclosing said bleeding means in an evacuated chamber, and means applying subatmospheric pressure to said other one of said bellows.

7. A pressure control system comprising, a first means having a variable pressure which is desired to be controlled, a second means having a reference pressure, a first self-balancing servo system coupled to said first and second means and operated in response to said variable pressure and said reference pressure and developing a first signal representative of the difference in said pressures, a second self-balancing servo system coupled to said first system and said first means and operated in response to said first signal and said variable pressure and developing a second signal representative of the difference in said first signal and said variable pressure, and third means coupled to said second system and operated by said second signal and controlling said variable pressure of said first means.

8. A system as set forth in claim 7 in which said first servo system incorporates a pressure-to-voltage transducer and said second servo system incorporatese a voltage-to-pressure transducer.

9. A system as set forth in claim 7 incorporating means applying a third signal to said second servo system to operate the same jointly by said first and third signals.

10. A system as set forth in claim 7 in which said first servo system is balanced quicker than said second servo system.

11. A system as set forth in claim 7 in which said second system includes a spill valve that develops said second signal in the form of a pressure signal.

12. A system as set forth in claim 11 in which said first means includes a second spill valve operated by a diaphragm controlled by said pressure signal.

13. A system as set forth in claim 12 in which said second spill valve is in the upstream side of an outlet conduit to which said first and second servo systems are coupled.

14. A system as set forth in claim 13 in which said first spill valve and said diaphragm are connected by a conduit to the upstream side of said second spill valve.

15. A system as set forth in claim 14 in which the last-mentioned conduit has a restricted opening therein.

16. A system as set forth in claim 7 in which said variable pressure of said first means is subatmospheric, said reference pressure of said second means is subatmospheric, and said second servo system is within an evacuated chamber.

17. In a pressure control system of the character described, the combination comprising force balancing means including a movable element, said force balancing means including a first means and a second means for applying a corresponding first force and a second force to said force balancing means to achieve a positioning of said movable element representative of the differences in said first and second forces, an inlet line, an outlet line, pressure changing means between said inlet line and said outlet line for changing the pressure in said outlet line, means applying pressure from said outlet line to said first means to develop said first force, means deriving an electrical quantity responsive to pressure in said outlet and applying said electrical quantity to said second means to develop said second force, and pressure operated means controlled by said movable element for adjusting said pressure changing means.

18. The combination set forth in claim 17 in which said pressure operated means includes a chamber having a movable wall, attached to said pressure changing means, fluid conduit means extending from said inlet line to said chamber, and said movable element controlling the pressure in said chamber.

19. The combination set forth in claim 18 in which said conduit means has a restriction, a branch conduit line extending from said conduit means and on the downstream side of said restriction, said branch conduit line and said movable element comprising a spill valve which adjusts the pressure in said chamber in accordance to adjust said pressuree changing means.

References Cited in the file of this patent

UNITED STATES PATENTS

| | | |
|---|---|---|
| 2,050,279 | Dahl | Aug. 11, 1936 |
| 2,409,871 | Krogh | Oct. 22, 1946 |
| 2,459,000 | Morris | Jan. 11, 1949 |
| 2,618,288 | Catheron | Nov. 18, 1952 |
| 2,634,747 | Markson | Apr. 14, 1953 |
| 2,984,251 | Quinby | May 16, 1961 |
| 3,005,462 | Hillman | Oct. 24, 1961 |
| 3,040,714 | Taiclet | June 26, 1962 |

FOREIGN PATENTS

| | | |
|---|---|---|
| 691,348 | Great Britain | May 13, 1953 |